United States Patent
Becker et al.

(10) Patent No.: US 12,395,037 B2
(45) Date of Patent: Aug. 19, 2025

(54) HYDROGEN RECIRCULATION BLOWER

(71) Applicant: BorgWarner Inc., Auburn Hills, MI (US)

(72) Inventors: Andre Becker, Bann (DE); Thomas Glass, Rockenhausen (DE); Kai Homann, Mainz (DE)

(73) Assignee: BorgWarner Inc., Auburn Hills, MI (US)

( * ) Notice: Subject to any disclaimer, the term of this patent is extended or adjusted under 35 U.S.C. 154(b) by 431 days.

(21) Appl. No.: 17/672,056

(22) Filed: Feb. 15, 2022

(65) Prior Publication Data
US 2023/0223811 A1 Jul. 13, 2023

(30) Foreign Application Priority Data
Jan. 13, 2022 (DE) .................. 102022100750.2

(51) Int. Cl.
| | |
|---|---|
| H02K 5/136 | (2006.01) |
| F04D 13/06 | (2006.01) |
| F04D 17/16 | (2006.01) |
| F04D 25/06 | (2006.01) |
| F04D 29/02 | (2006.01) |
| F04D 29/40 | (2006.01) |
| H02K 15/14 | (2025.01) |

(52) U.S. Cl.
CPC ......... *H02K 5/136* (2013.01); *F04D 25/0606* (2013.01); *H02K 15/14* (2013.01); *F04D 13/0626* (2013.01); *F04D 17/16* (2013.01); *F04D 25/0693* (2013.01); *F04D 29/023* (2013.01); *F04D 29/403* (2013.01)

(58) Field of Classification Search
CPC ........ H02K 5/136; H02K 15/14; H02K 15/12; H02K 5/128; F04D 25/06; F04D 25/0606; F04D 13/0606; F04D 13/0626; F04D 17/16; F04D 25/0693; F04D 29/023; F04D 29/403; Y02E 60/50
See application file for complete search history.

(56) References Cited

U.S. PATENT DOCUMENTS

| | | | |
|---|---|---|---|
| 7,675,209 B2 | 3/2010 | Masoudipour et al. | |
| 9,391,493 B2 | 7/2016 | Leung et al. | |
| 2001/0030475 A1* | 10/2001 | Kliman | H02K 3/493 310/89 |
| 2003/0184182 A1* | 10/2003 | Smith, Jr. | H02K 15/022 310/216.084 |
| 2016/0108919 A1* | 4/2016 | Dai | F04D 29/041 417/420 |
| 2019/0113038 A1* | 4/2019 | Eschner | F04D 13/0606 |
| 2019/0309754 A1* | 10/2019 | Lee | F04D 29/046 |
| 2022/0186686 A1* | 6/2022 | Honda | H02K 9/08 |

* cited by examiner

*Primary Examiner* — David N Brandt
(74) *Attorney, Agent, or Firm* — Howard & Howard Attorneys PLLC

(57) ABSTRACT

A hydrogen recirculation blower is used in a hydrogen return arrangement in a fuel cell system. The blower includes a rotatable rotor with an end region on which an impeller is arranged, and a stator with coil windings and with a hydrogen barrier which is formed as a hollow body. The rotor is arranged in a cavity of the hydrogen barrier, with the hydrogen barrier running both between the rotor and the coil windings and between the impeller and the coil windings. The rotor and the stator form an electric motor for driving the impeller.

7 Claims, 3 Drawing Sheets

HYDROGEN RECIRCULATION BLOWER

CROSS-REFERENCE TO RELATED APPLICATIONS

This application claims priority pursuant to 35 U.S.C. 119(a) to German Patent Application No. 102022100750.2, filed Jan. 13, 2022, which application is incorporated herein by reference in its entirety.

BACKGROUND

The invention relates to a hydrogen recirculation blower for a hydrogen return arrangement in a fuel cell system.

A fuel cell system may be provided in a vehicle. Electrical energy is generated in the fuel cell system, for example using hydrogen, for the propulsion of the vehicle.

Aside from a fuel cell unit to which gaseous hydrogen is supplied, the fuel cell system may have a return arrangement for returning unconsumed hydrogen gas to the inlet of the fuel cell unit. A hydrogen recirculation blower is provided in the return arrangement in order to return the unconsumed hydrogen gas to the inlet.

The hydrogen recirculation blower may be in the form of an electrically operated compressor, for example radial compressor. Use is also made of side-channel compressors and rotary-piston blowers, a so-called Roots blower, with a relatively low setpoint pressure ratio.

U.S. Pat. No. 7,675,209 B2 presents a compressor with an electric motor that is surrounded by a cooling jacket. U.S. Pat. No. 9,391,493 B2 presents an electric motor, the stator of which has a potting cup on a shell region and on an end region.

SUMMARY

It is the object to provide an improved hydrogen recirculation blower.

The object is achieved by means of a hydrogen recirculation blower for a hydrogen return arrangement in a fuel cell system. The hydrogen recirculation blower comprises a rotatable rotor with an end region on which an impeller is arranged, and a stator with coil windings and with a hydrogen barrier which is formed as a hollow body, the rotor being arranged in a cavity of the hydrogen barrier, and the hydrogen barrier running both between the rotor and the coil windings and between the impeller and the coil windings, and the rotor and the stator forming an electric motor for driving the impeller.

The rotor comprises a rotatably mounted shaft, with the shaft and bearings for the positioning and mounting the shaft advantageously being arranged in the cavity of the hydrogen barrier. The impeller is fastened to that end region of the shaft which projects out of the cavity.

Like an electric motor for assistively driving a compressor impeller in turbochargers, the hydrogen recirculation blower has a rotor with an impeller and has a stator. Additionally, however, a hydrogen barrier is provided in order to protect magnetically active regions of the stator, specifically the windings thereof, against an ingress of hydrogen. Despite seals with respect to the space in which the impeller rotates, it can be possible, as the shaft of the rotor rotates, for the hydrogen to ingress into the cavity that is surrounded by the magnetically active regions of the stator. A spark occurring at windings of the magnetically active region or at an adjacent set of electronics, for example at a stator printed circuit board, could have fatal consequences, because the hydrogen could ignite, which could lead to a vehicle fire. This is prevented by means of the hydrogen barrier, which prevents an ingress of the hydrogen into the region of the windings. Owing to the hydrogen barrier, spark-causing defects in the region of the windings or adjacent set of electronics lead, in the worst case, only to a failure of the drive, but no longer to a vehicle fire.

The impeller effects a hydrogen flow between an inlet and an outlet in order to return hydrogen to the anode-side inlet of the fuel cell system. If the impeller acts as a compressor, the hydrogen flow at the outlet side is advantageously compressed.

The electric motor of the hydrogen recirculation blower comprises the stator, which is connected to a housing, and the rotor, which is rotatable inside the stator. Both the stator and the rotor have magnetically active regions, the interaction of which causes the rotation of the rotor and thus the driving of the impeller. In one embodiment, the magnetically active region of the rotor comprises one or more permanent magnets. The magnetically active region of the stator comprises coil windings, by means of which a magnetic field which varies over time can be induced, the interaction of which magnetic field with the permanent magnetic field of the rotor leads to the rotation of the rotor.

The hydrogen barrier at least reduces, and ideally prevents, the permeation of hydrogen to the coil windings and to components carrying electrical current or voltage, such that the region carrying electrical current, with the magnetically active region of the stator and the components carrying electrical current or voltage, is sealed off against the ingress of hydrogen. This is achieved on the one hand by way of the shape, because the hydrogen barrier extends over the coil windings toward the cavity in which the rotor rotates, and toward the impeller, both in a longitudinal direction and in a transverse direction with respect to the rotor. This effect is advantageously assisted by virtue of the hydrogen barrier comprising a material that acts as a hydrogen barrier, such that the ingress of hydrogen is reduced or in the best case prevented. The hydrogen barrier may be formed as potting of the windings, or as a pot-shaped barrier. The potting, or the pot-shaped barrier, advantageously has a material that acts as a hydrogen barrier.

In one embodiment, a printed circuit board is provided which is arranged spatially separately from the cavity and adjacent to that side of said cavity which is averted from the impeller. This printed circuit board has the set of power electronics for controlling the electric motor, in particular the stator. Spark-generating defects may also occur in the region of the printed circuit board, which defects, in the absence of a spatial partition with respect to the cavity, would have the consequences discussed above. The spatial partition likewise has the effect that hydrogen ignition in the region of the printed circuit board is avoided. The hydrogen barrier involves little cost outlay and lengthens the service life.

In one embodiment, hydrogen barrier is formed as a potting of the windings with the material that acts as a hydrogen barrier, such that the potting not only protects and supports the windings but also, by way of the potting material that acts as a hydrogen barrier, protects said windings against the ingress of hydrogen. The potting material has an insulating action, and an ingress of hydrogen is impeded or entirely prevented. Such a potting material may for example comprise or be liquid silicone or potting resin. A further exemplary embodiment of potting material is injection-molded plastic. Other materials are conceivable for the hydrogen barrier.

An alternative embodiment provides that the hydrogen barrier comprises a containment can with a base at a side averted from the impeller. The base forms or assists the spatial partition with respect to the printed circuit board in order to prevent the permeation of hydrogen thereto. The containment can surrounds the rotor longitudinally and may have a hollow cylindrical shape, in particular with a circular cross section.

In one embodiment, the containment can comprises a collar, which encircles the cavity, at the side facing toward the impeller. Such a flange-like collar extends between the windings and the impeller at an angle, in particular transversely with respect to the axis of rotation of the rotor. It not only forms a spatial partition but possibly also guides hydrogen that impinges on the collar away from the cavity radially, such that the hydrogen can escape at the side of the housing.

On the inside and/or outside of the cavity, there may be disposed a stabilizing coating or a stabilizing means. This allows even a brittle material that acts as a hydrogen barrier to be used for the containment can. The coating or the stabilizing means may for example be formed from plastic. The stabilizing means may for example be a sleeve which is pushed into the cavity or pushed over the outside of the containment can, and which for example has a lattice-like structure. It is also conceivable for the stabilizing means to take the form of a coating. A potting of the windings that is in direct contact with the containment can also has a stabilizing action. In the case of a potting composed of a further material that acts as a hydrogen barrier, the potting can assist the barrier action of the containment can.

In one embodiment, an end region of the rotor that is averted from the impeller is arranged in the containment can, such that contact between the rotor and the printed circuit board is prevented.

In one embodiment, the containment can is formed as a single piece, such that there are no joints in the containment can at which hydrogen could more easily escape.

The containment can may be formed from in particular synthetic plastic or ceramic, for example Teflon. The containment can is advantageously composed of an insulating material, and may also be an insulation layer composed of special synthetic plastic for the interior space, and in particular for the inwardly facing magnetically active region. Potentially brittle ceramic can be supported by a stabilizing coating or a stabilizing means.

In one embodiment, the hydrogen recirculation blower comprises a housing with a side wall, which surrounds the stator, and with a housing wall as a spatial partition, one side of which housing wall faces toward the stator and the rotor and the opposite side of which housing wall faces toward the printed circuit board. The housing holds the stator and the rotor and protects them against external influences. For the contacting of the windings of the stator, there are cutouts in the housing wall, through which cutouts the printed circuit board is electrically conductively connected to the stator. Seals at the cutouts prevent an escape of hydrogen to the printed circuit board. The housing, which may be of multi-part form, also comprises an impeller housing, in which the impeller rotates in a cavity through which hydrogen flows. Despite seals, which cannot provide a one hundred percent sealing action in the presence of rotating shafts, the hydrogen can escape from this cavity into the cavity in which the rotor rotates.

In one embodiment, that side of the hydrogen barrier which faces toward the impeller extends as far as the side wall of the housing, such that any hydrogen that escapes from the impeller is guided out of the housing over that side of the hydrogen barrier which faces toward the impeller.

A method for manufacturing a hydrogen recirculation blower provides the following steps: arranging coil windings of a stator in a housing, inserting a sleeve into a free interior space, which is enclosed by the coil windings, in the housing, potting the coil windings, such that an interior of the sleeve remains free from the potting material, removing the sleeve after the potting material has cured, the cured potting material acting as a hydrogen barrier, and inserting a rotor into the region that is free from the potting material. The hydrogen barrier can thus be easily formed by potting, in the case of which the potting material is introduced into the space with the coil windings between the housing and the sleeve.

BRIEF DESCRIPTION OF THE DRAWINGS

A number of exemplary embodiments will be discussed in more detail below on the basis of the drawing, in which.

In the figures, components that are identical or have the same effect are provided with the same reference designations.

DETAILED DESCRIPTION

Figure 1:
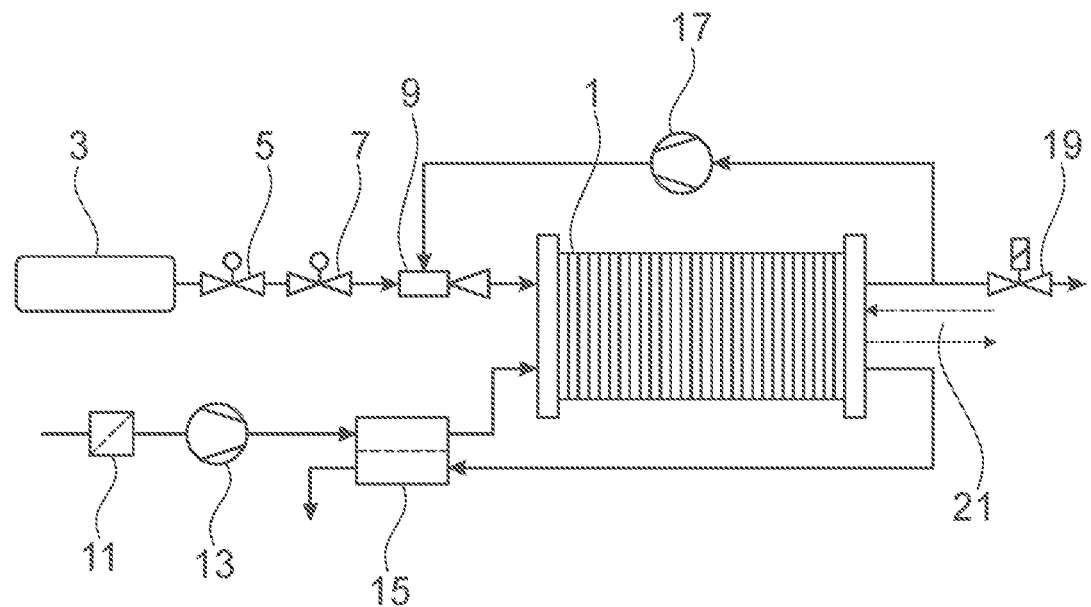
FIG. 1 schematically shows an exemplary embodiment of a fuel cell system.

FIG. 1 schematically shows an exemplary embodiment of a fuel cell system with a fuel cell unit 1 that comprises a stack with multiple fuel cells. The fuel cells each have an anode and a cathode and an interposed membrane. A fuel, in this exemplary embodiment gaseous hydrogen, is supplied at the anode side. The supply is performed from a hydrogen store 3, which is in the form of a tank, via a pressure reducer 5 and via a pressure regulating valve 7 connected downstream of the pressure reducer 5. Hydrogen from the pressure regulating valve 7 and hydrogen returned from the fuel cell unit 1 are supplied at the anode side via an ejector 9 of the fuel cell unit 1. An oxidant, commonly air, is supplied at the cathode side. The supply is performed via a filter 11 and an air compressor 13. The compressed air passes through an air humidifier 15, in order to improve efficiency, and is supplied to the fuel cell unit 1 at the cathode side.

The fuel and the oxidant react in the interior of the fuel cells and release energy, with water simultaneously being generated. Hydrogen that flows from the hydrogen store 3 into the anode side is however normally not converted entirely into water. Nitrogen and water which are formed during the reaction in the anode, and which would progressively decrease efficiency, are discharged from the fuel cell unit 1 in order to create space for hydrogen. An efficient reaction is thus made possible, and the sensitive membrane in the hydrogen cells is not damaged, such that the fuel cell system 1 functions effectively even at cold temperatures and has a long service life. Owing to the abovementioned points, a return circuit is provided, which has a hydrogen recirculation blower 17 in the hydrogen return arrangement and has a discharge valve 19 at the anode. The return circuit, on the one hand, feeds the unconsumed hydrogen back into the anode inlet and, on the other hand, discharges the nitrogen and the excess water through the discharge valve 19. The water is guided to the air humidifier 15 for the purposes of humidifying the inlet air. The hydrogen recirculation blower 17 may be formed integrally at the anode side of the fuel cell stack.

Cooling connections 21 of the fuel cell unit 1 are connected to a cooling system for the purposes of cooling the fuel cell unit 1.

Figure 2:
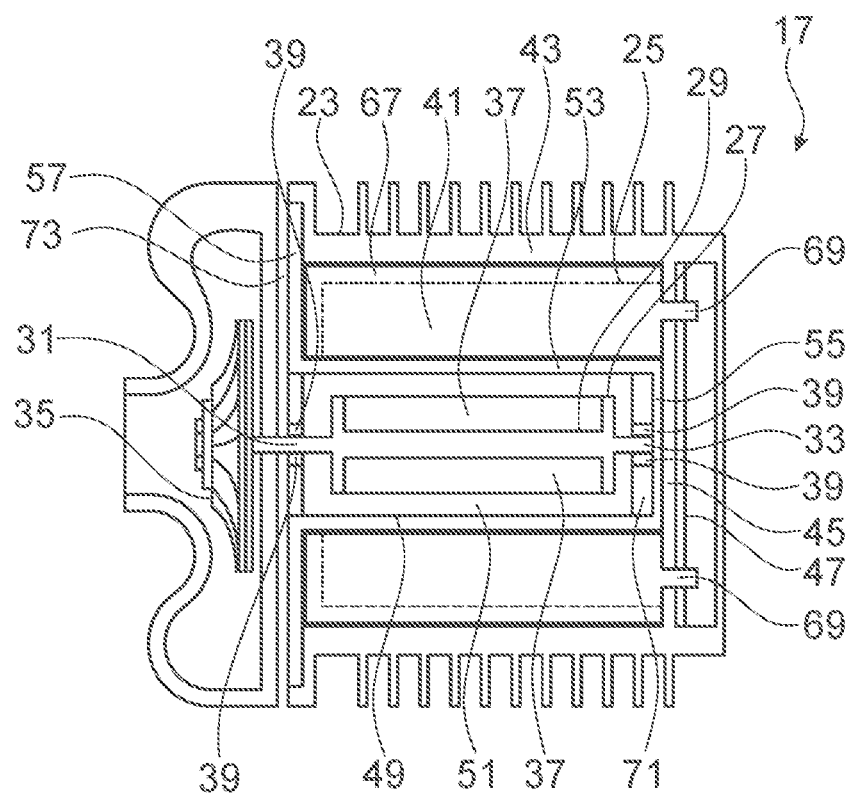
FIG. 2 is a schematic sectional illustration through an exemplary embodiment of a hydrogen recirculation blower.

FIG. 2 is a schematic sectional illustration through an exemplary embodiment of a hydrogen recirculation blower 17. Such a hydrogen recirculation blower 17 may be a constituent part of a fuel cell system such as has been described by way of example in conjunction with FIG. 1.

The hydrogen recirculation blower 17 has a housing 23, a stator 25 that is arranged in the housing 23, and a rotor 27 that is rotatable relative to the stator 25 and the housing 23. The stator 25 and the rotatable rotor 27 form an electric motor.

The rotor 27 has a shaft 29 with a first end region 31 and a second end region 33. At the first end region 31, there is arranged an impeller 35 that is set in rotation by rotation of the shaft 29.

The housing 23 surrounds both the stator 25 and the rotor 27, which rotates in the stator 25 and which has the impeller 35. In the housing part that surrounds the impeller 35, there are also an inlet and an outlet for hydrogen. The impeller 35 generates a hydrogen flow, which is returned to the fuel cell unit 1 at the anode side and which flows to the anode side of the fuel cell unit 1 as a result of the rotation of the impeller 35. The hydrogen flow may additionally be compressed by the impeller 35.

The housing 23 has a side wall 43, which longitudinally surrounds the stator 25, and a lower housing wall 45 at a side of the rotor 27 that is averted from the impeller 35. The stator 25 and the rotor 27 are arranged on that side of the housing wall 45 which faces toward the impeller 35. On a side of the housing wall 45 that is averted from the impeller 35, there is arranged a printed circuit board 47 that controls the rotor 27 and the stator 25, which act as an electric motor. The housing wall 45 forms a spatial partition between the rotor 27 and the stator 25 on one side of the housing wall 45 and the printed circuit board 47 on the other side. In the housing wall 45, there are cutouts through which electrical contact is established between the printed circuit board 47 and the stator 25, by virtue of contacts 69 of the stator 25 being led to the printed circuit board 47.

The rotor 27 is arranged rotatably inside the stator 25. The rotor 27 is guided by bearings 39 on the housing at the end regions 31, 33. The bearings 39 are in the form of radial bearings, and may also comprise axial bearings. The rotor 27 comprises a magnetically active region with one or more magnets 37 arranged on its shaft 29, which magnets are in the form of permanent magnets and are arranged between the end regions 31, 33.

The stator 25 surrounds the rotor 27 in a longitudinal direction and comprises a magnetically active region with coil windings 41, which are composed for example of copper wire and which are wound onto a stator core 67. The stator core 67 holds and mechanically fixes the coil windings 41. Coil windings 14 and stator core 67 may be potted. A variable magnetic field can be induced in the coil with the coil windings 41. This, in interaction with the magnetic field of the magnetically active region in the rotor 27, causes said rotor to rotate, thus driving the impeller 35.

The stator 25 furthermore comprises a hydrogen barrier 49 which is formed as a hollow body and in the cavity 51 of which the rotor 27 is arranged. In this exemplary embodiment, the hydrogen barrier 49 is in the form of a containment can 53, which has a cylindrical shell and a base 55 at its side averted from the impeller 35. At the side facing toward the impeller 35, the containment can 53 has an encircling flange-like collar 57, which extends radially from the cavity 51 to the outer region of the housing 23 and thus covers the coil windings 41 of the stator 25 on the side facing toward the impeller 35. The hydrogen barrier 49 in the form of the containment can 53 thus extends both axially with respect to the rotor 27, between the rotor 27 and the coil windings 41, and radially with respect to the rotor 27, between the impeller 35 and the coil windings 41.

The bearings 39 are arranged in regions of the housing 23 that extend via or through the containment can 53 to the shaft 29. In the case of a containment can 53 with a closed base 55, a separate means, for example a plate 71, may also be provided in the interior of the containment can 53 at the base 55, in which means the bearing 39 for the second end region 33 is arranged.

The containment can 53 protects the region carrying electrical current, with the magnetically active region of the stator 25 with its coil windings 41 and components carrying electrical current or voltage, against the ingress of hydrogen. Despite sealing means provided at the impeller 35, hydrogen can creep into the cavity 51 in which the rotor 29 rotates, in particular at the rotating shaft 29 and at the bearings 39. Likewise, a permeation of hydrogen to the printed circuit board 47 is prevented by the base 55 of the containment can 53, assisted by the housing wall 45. If sparking were to occur in the stator 25 or at the printed circuit board 47, hydrogen situated there would ignite, which would result in severe damage, including a possible fire. This possible consequential damage resulting from sparking is prevented by the hydrogen barrier 49.

The hydrogen barrier 49 not only forms a mechanical barrier but also has a material that acts as a hydrogen barrier. Only little, or scarcely any, permeation of the small hydrogen molecules through the hydrogen barrier is possible. In the ideal case, said hydrogen barrier is impermeable to hydrogen. Such a material may be a ceramic or plastic, for example Teflon. The permeability in the case of plastics is based on the mobility of the polymer chains. The stiffer these are, the less permeable the material is, and the lower the permeability thereof is. Nanoparticles or coatings can improve the barrier characteristics of the material.

The mechanical barrier action is intensified by virtue of the containment can 53 being formed as a single piece, such that there are no cracks or seams that could be more sensitive to the ingress of hydrogen. A further point is that the second end region 33, averted from the printed circuit board 47, of the shaft 29 is arranged within the containment can 53, which encloses the rotor 27 to this side. Hydrogen flowing out of the impeller 35 is guided out of the housing 23 by the collar 57 which covers the windings 41 in the direction of the impeller 35, because this path, in the form of a gap 71, has a lower resistance than the longer paths, which have obstructions, to the stator 25.

Figure 3:
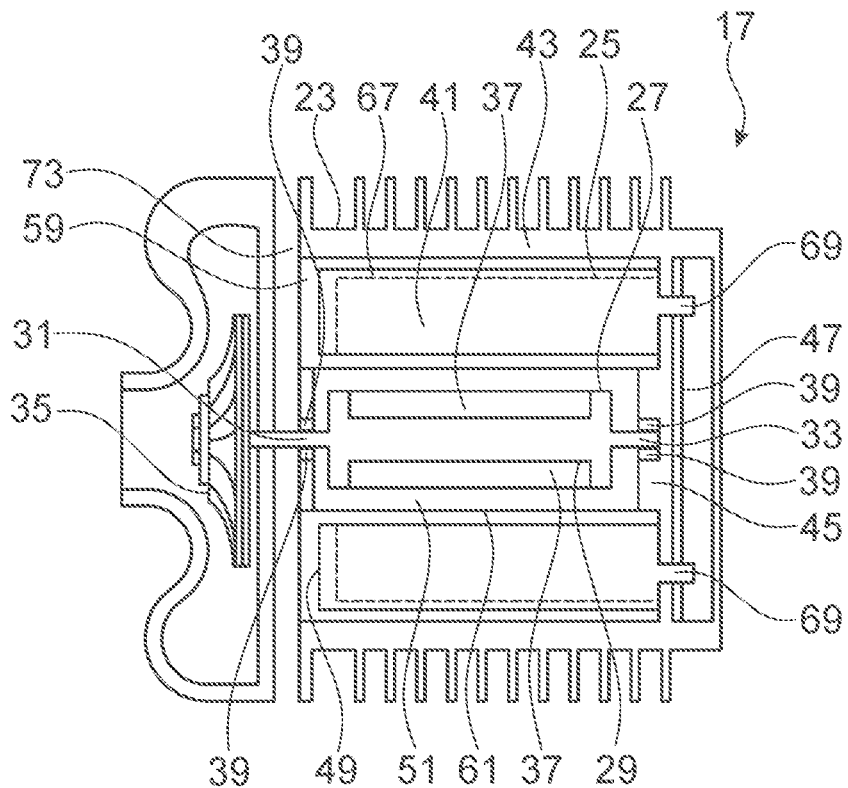
FIG. 3 is a schematic sectional illustration through a further exemplary embodiment of a hydrogen recirculation blower.

FIG. 3 is a schematic sectional illustration through a further exemplary embodiment of a hydrogen recirculation blower 17. In order to avoid repetitions, the description will concentrate on differences in relation to the preceding exemplary embodiment.

In this exemplary embodiment, a hydrogen barrier 49 in the form of a hollow body, in the cavity 51 of which the rotor 27 is arranged, is formed as a potting 59 around the windings 41. The potting material acts as a hydrogen barrier. It may be an elastomer and, for example, comprise liquid silicone. The hydrogen barrier 49, which is in the form of a potting 59, has a hollow cylindrical shape, which is open both at the side facing toward the impeller 35 and at the side averted from the impeller 35. The hydrogen barrier 49 with respect to the printed circuit board 47 is thus formed by the housing wall 45, in which the bearing 39 for the second end region 33 is also provided. The potting material is advantageously cohesively connected to the side walls 43 and the housing wall 45. This connection is formed during the potting process.

That side of the hydrogen barrier 49, formed as a hollow body, which faces toward the impeller 35 and extends to the side wall 43 guides any hydrogen that leaks from the impeller 35 in the direction of the side wall 43 through a gap 73, and thus out of the housing 23. This diverting action assists the barrier action of the potting material and of the housing wall 45 in order to protect the windings 41 and the printed circuit board 47 against an inflow of hydrogen. Additionally, in the interior of the cavity 51 and/or on the side facing toward the impeller 35, there may be provided a coating 61 that intensifies the barrier action of the potting material.

Figure 4:
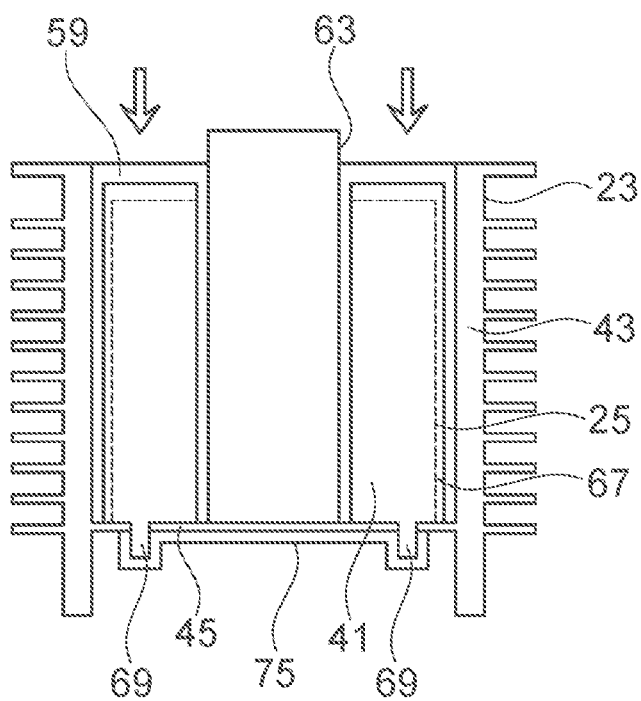
FIG. 4 is a schematic sectional illustration through an exemplary embodiment of an intermediate product during the manufacture of a hydrogen recirculation blower.

FIG. 4 illustrates the manufacture of a hydrogen barrier 49 that is formed as a potting of the windings 41. The windings 41 are inserted with the stator core 47, on which they are arranged, into the housing 23. A sleeve 63 is inserted into the free interior space in the housing 23, which interior space is enclosed by the windings 41. Said sleeve defines what will later be the cavity 51, in which the rotor 27 is received. In order to keep the contacts 69 of the windings 41 free from potting material, a potting protector 75 is provided at that side of the housing wall 45 which faces toward the printed circuit board 49, which has not yet been installed. The sequence of the steps described above is interchangeable. In the next step, the windings 41 are potted by virtue of potting material being introduced between the housing 23 and sleeve 63, such that the sleeve interior remains free from the potting material. This is illustrated by the arrows. The potting material advantageously forms a cohesive connection with the side wall and the housing wall 45. After the potting material has cured, the sleeve 63 is removed, such that the cured potting material now acts as a hydrogen barrier. Subsequently, the rotor 27 is inserted into the interior region which is free from the potting material and which forms the cavity 51 in the hydrogen barrier 49, and the printed circuit board 47 is installed and is electrically conductively connected to the stator 25.

Figure 5:
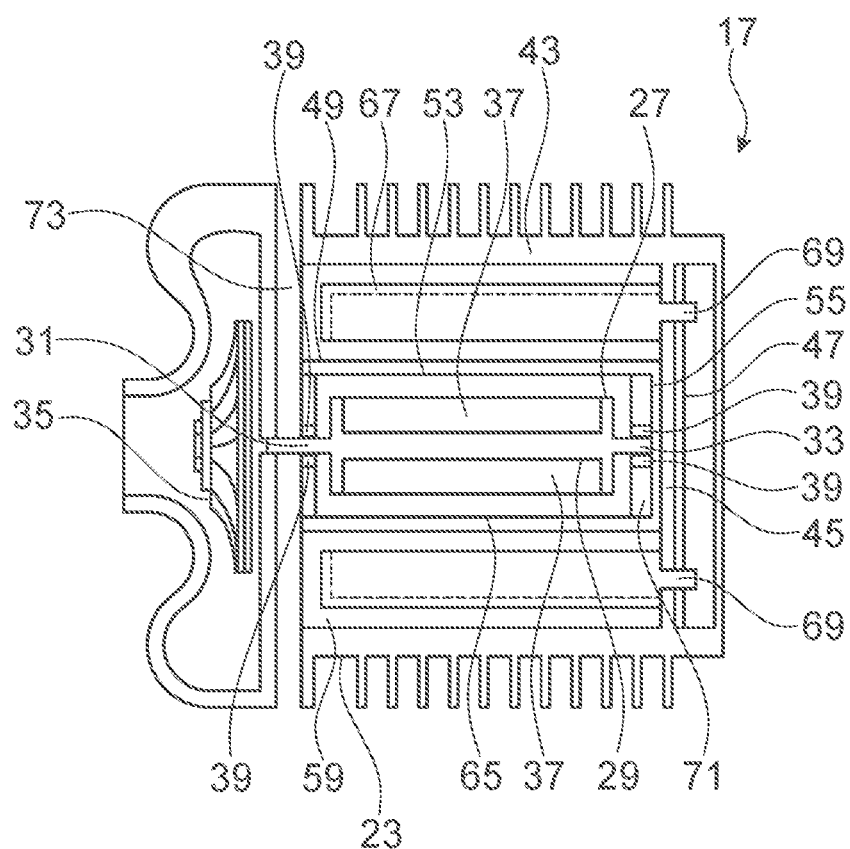
FIG. 5 is a schematic sectional illustration through a yet further exemplary embodiment of a hydrogen recirculation blower.

FIG. 5 is a schematic sectional illustration through a further exemplary embodiment of a hydrogen recirculation blower 17. In order to avoid repetitions, the description will concentrate on differences in relation to the preceding exemplary embodiments.

In this exemplary embodiment, the hydrogen barrier 49 comprises a collarless, single-piece containment can 53 with a base 55. The windings 41 and the stator core 67 of the stator 25 are potted between the containment can 53 and the housing 23, wherein the potting material, and likewise the material of the containment can 53, act as a hydrogen barrier. The materials are different. Such a hydrogen barrier 49 is manufactured by virtue of the containment can 53, rather than a sleeve 63 as described in conjunction with FIG. 4, being inserted in the centre of the windings 41 and remaining in place even after the potting and curing of the potting material. This has the advantage that the potting material stabilizes the containment can 53 from the outside, which makes it easier to use a brittle material, such as Teflon, for the containment can. This effect can be assisted by virtue of a structure, for example a hollow cylinder with a lattice-like structure, being provided as a stabilizing means 65 in the containment can interior, which stabilizing means likewise supports the containment can 53.

In the exemplary embodiment described, the potting 59 forms that side of the hydrogen barrier 49 which faces toward the impeller 35. Owing to the connection to the containment can 53 and the housing 23, any hydrogen that escapes at the impeller 35 is discharged out of the housing 23 over the potting 59.

Alternatively or in addition, after the potting, a ring-shaped collar plate may be mounted onto that side of the potting 59 which faces toward the impeller 35. In the case of a collar plate composed of the same material as the containment can 53, said collar plate likewise acts as a hydrogen barrier, such that it is not imperatively necessary to also use such a material for the potting, which would then substantially have a stabilizing function.

The features specified above and in the claims and shown in the figures can be advantageously implemented both individually and in various combinations. The invention is not restricted to the exemplary embodiments described, but may be modified in various ways within the scope of the abilities of a person skilled in the art.

REFERENCE DESIGNATIONS

1 Fuel cell unit
3 Hydrogen store
5 Pressure reducer
7 Pressure regulating valve
9 Ejector
11 Filter
13 Air compressor
15 Air humidifier
17 Hydrogen recirculation blower
19 Discharge valve
21 Cooling connection
23 Housing
25 Stator
27 Rotor
29 Shaft
31 First end region
33 Second end region
35 Impeller
37 Magnet
39 Bearing
41 Winding
43 Side wall
45 Housing wall
47 Printed circuit board
49 Hydrogen barrier
51 Cavity
53 Containment can
55 Base
57 Collar
59 Potting
61 Coating
63 Sleeve
65 Stabilizing means
67 Stator core
69 Contact 71 Plate
73 Gap
75 Potting protector

What is claimed is:

1. A hydrogen recirculation blower for a hydrogen return arrangement in a fuel cell system, said hydrogen recirculation blower comprising:
   a rotatable rotor with a first end region on which an impeller is arranged and with a second end region facing away from the impeller,
   a stator with coil windings and with a hydrogen barrier which is formed as a hollow body, the rotor being arranged in a cavity of the hydrogen barrier, and the hydrogen barrier running both between the rotor and the coil windings and between the impeller and the coil windings, wherein the rotor and the stator form an electric motor for driving the impeller,
   a printed circuit board which is arranged spatially separately from the cavity and adjacent to a side of the cavity which faces away from the impeller,
   a first bearing guiding the rotor at a first end region of a housing adjacent the impeller, and
   a second bearing guiding the rotor at a second end region of the housing opposite the first end region and spaced from the impeller,
   wherein the hydrogen barrier comprises a containment can formed as a single piece with a cylindrical shell surrounding the rotor longitudinally, with a base at a side of the containment can facing away from the impeller and preventing permeation of hydrogen to the printed circuit board, and with a collar, which encircles the cavity, at a side of the containment can facing toward the impeller, and which covers the windings in a direction from the windings to the impeller, wherein the base of the containment can comprises a closed base,
   wherein the second bearing is located in the containment can, and
   wherein the rotor is arranged in the containment can in such a manner that the second end region is arranged inside the containment can.

2. The hydrogen recirculation blower as claimed in claim 1, wherein the containment can is formed from a material that acts as the hydrogen barrier.

3. The hydrogen recirculation blower as claimed in claim 1, wherein the housing comprises a side wall, which surrounds the stator, and housing wall as a spatial partition, wherein one side of the housing wall faces toward the stator and the rotor, and an opposite side of the housing wall faces toward the printed circuit board.

4. The hydrogen recirculation blower as claimed in claim 3, wherein cutouts are provided in the housing wall, and wherein electrical contact is established between the printed circuit board and the stator through the cutouts.

5. The hydrogen recirculation blower as claimed in claim 3, wherein a side of the hydrogen barrier which faces toward the impeller extends as far as the side wall of the housing.

6. The hydrogen recirculation blower as claimed in claim 1, wherein the containment can is formed from ceramic or plastic.

7. The hydrogen recirculation blower as claimed in claim 1, wherein the collar extends between the windings and the impeller transversely with respect to an axis of rotation of the impeller.

* * * * *